United States Patent [19]

Sensui

[11] Patent Number: 5,241,168
[45] Date of Patent: Aug. 31, 1993

[54] FOCUS DETECTING APPARATUS WITH SELECTIVELY POSITIONED DEFLECTING COMPONENT

[75] Inventor: Takayuki Sensui, Tokyo, Japan

[73] Assignee: Asahi Kogaku Kogyo Kabushiki Kaisha, Tokyo, Japan

[21] Appl. No.: 904,950

[22] Filed: Jun. 26, 1992

[30] Foreign Application Priority Data

Jun. 26, 1991 [JP]  Japan .................. 3-154943

[51] Int. Cl.⁵ ............................ H01J 40/14
[52] U.S. Cl. ...................... 250/208.1; 354/404
[58] Field of Search .......... 250/201.8, 216, 204; 354/404, 406, 407, 408

[56] References Cited

U.S. PATENT DOCUMENTS

| 4,283,863 | 8/1981 | Heiniger et al. ........... 354/404 |
| 4,293,205 | 10/1981 | Tokutomi et al. . |
| 4,387,975 | 6/1983 | Araki .................. 250/201.8 |
| 4,428,653 | 1/1984 | Schaefer . |
| 4,636,624 | 1/1987 | Ishida et al. . |
| 4,659,917 | 4/1987 | Suzuki et al. . |
| 4,829,332 | 5/1989 | Shindo . |
| 4,833,497 | 5/1989 | Sugawara . |
| 5,004,902 | 4/1991 | Matsui et al. . |
| 5,017,005 | 5/1991 | Shindo . |

FOREIGN PATENT DOCUMENTS

| 0351855 | 1/1990 | European Pat. Off. . |
| 2011212 | 7/1979 | United Kingdom . |
| 2092855 | 8/1982 | United Kingdom . |
| 2178621 | 2/1987 | United Kingdom . |

Primary Examiner—David C. Nelms
Assistant Examiner—K. Shami
Attorney, Agent, or Firm—Sandler, Greenblum & Bernstein

[57] ABSTRACT

A focus detecting apparatus in which a pair of bundles of rays, transmitted through different portions of an exit pupil of a taking lens, are transmitted through a common focus detecting zone on a predetermined focal plane of the taking lens and converged onto corresponding line sensors through a condenser lens and separator lenses to re-image the image formed on the predetermined focal plane of the taking lens into two separate images. A light deflector is provided between the taking lens and the separator lenses to deflect an optical path of the bundles of rays to make the bundles of rays incident upon the separator lenses and the corresponding line sensors.

18 Claims, 11 Drawing Sheets

FOCUS DETECTING APPARATUS WITH SELECTIVELY POSITIONED DEFLECTING COMPONENT

BACKGROUND OF THE INVENTION

1. Field of the Invention

The present invention relates to a focus detecting apparatus for detecting a focus state of a taking (i.e., photographing) lens of a camera or the like, with respect to an object to be photographed.

2. Description of Related Art

In a known focus detecting apparatus of a single lens reflex camera or the like, bundles of rays transmitted through different portions of an exit pupil of a taking lens are converged onto a pair of line sensors by a re-imaging lens (image reforming lens) of a focus detecting optical system. The focus state of the taking lens can then be detected in accordance with the relationship between outputs of the line sensors. The principle of focus detection by the focus detecting apparatus is disclosed, for example, in U.S. Pat. No. 4,636,624.

A focus detecting apparatus having an off-axis detecting area (i.e., a detecting area that is deviated from an optical axis) is a known apparatus for detecting the focus state of a taking lens with respect to an object located at a position other than the center of an image plane.

However, if the off-axis detecting area is significantly deviated from the optical axis, vignetting of the focus detecting optical system pupil may occur, for example, when the position or size of the exit pupil of the taking lens changes as a result of a lens change (i.e., when using an interchangeable lens) or when a zooming operation is effected. In such cases, the area of the focus detecting optical system pupil, through which the bundle of lo rays is transmitted, is reduced. As a result, the applicability of such an automatic focus detecting system to an interchangeable lens is limited or restricted.

SUMMARY OF THE INVENTION

The primary object of the present invention is to provide a focus detecting apparatus in which a bundle of rays can be effectively received by a line sensor, even if a change in position and size of an exit pupil of a taking lens occurs, so that the focus state of various taking lenses having different focal lengths can be precisely detected.

To achieve this objective, according to the present invention, there is provided a focus detecting apparatus in which a pair of bundles of rays transmitted through different portions of an exit pupil of a taking lens, are transmitted through a common focus detecting zone on a predetermined focal plane of the taking lens and are then converged onto corresponding line sensors through a condenser lens and separator lenses to re-image separate images of the image formed on the predetermined focal plane of the taking lens, wherein the improvement comprises a deflecting mechanism positioned between the taking lens and the separator lenses to deflect the optical path in a manner that makes the bundle of rays incident upon the separator lenses and the line sensors.

According to another aspect of the present invention, a focus detecting apparatus includes a pair of separator lenses which re-image an image of an object formed on a predetermined focal plane of a taking lens into two separate images, a pair of line sensors which receive the images formed by the separator lenses, and a deflecting mechanism positioned between the separator lenses and the taking lens to deflect the optical path by selectively inserting the deflecting mechanism into the optical path in accordance with a change in the exit pupil of the taking lens.

The present disclosure relates to subject matter contained in Japanese patent application No. 03-154943 (filed on Jun. 26, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
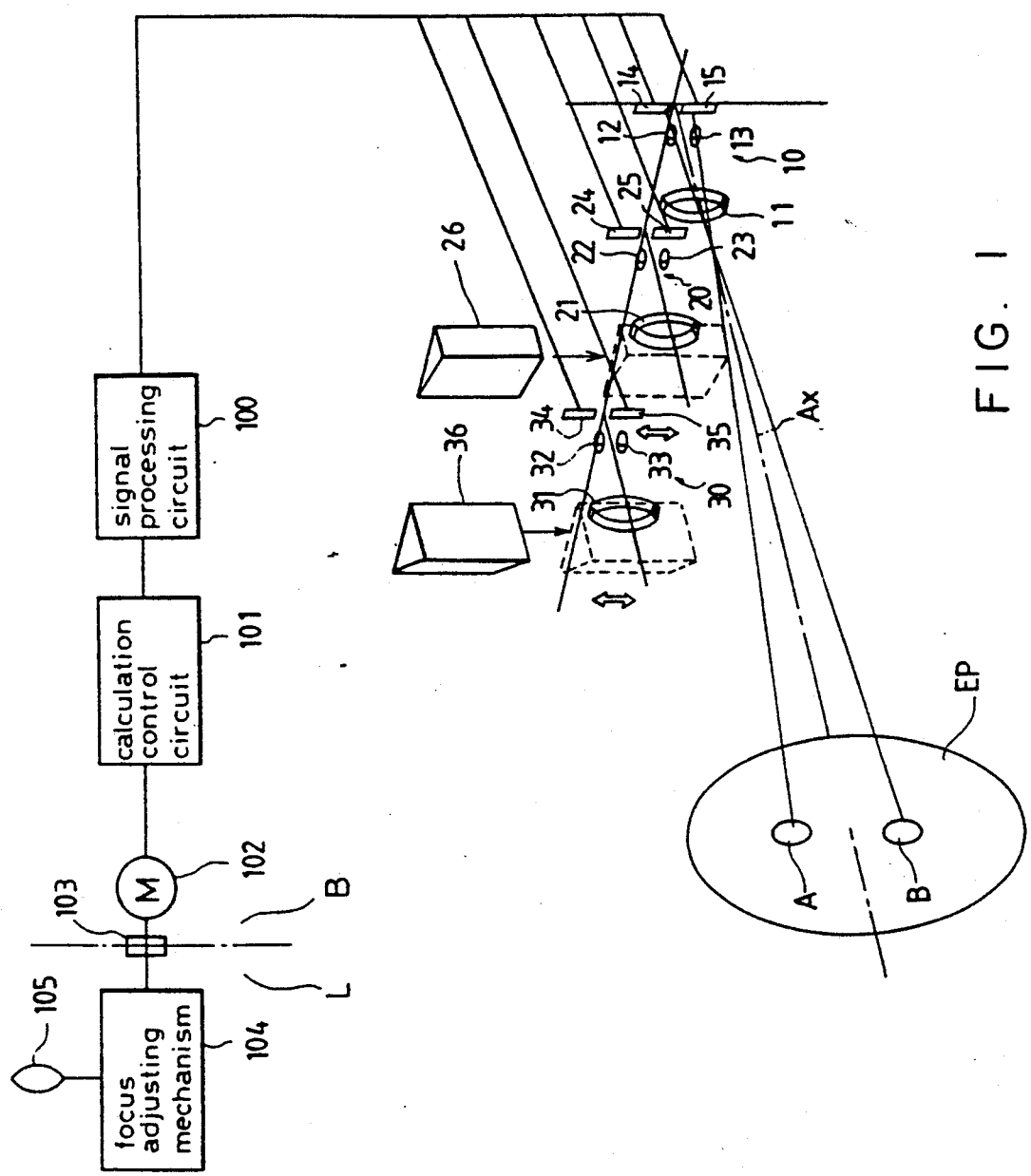
FIG. 1 is a schematic perspective view of a focus detecting apparatus according to a first embodiment of the present invention.
Figure 2:
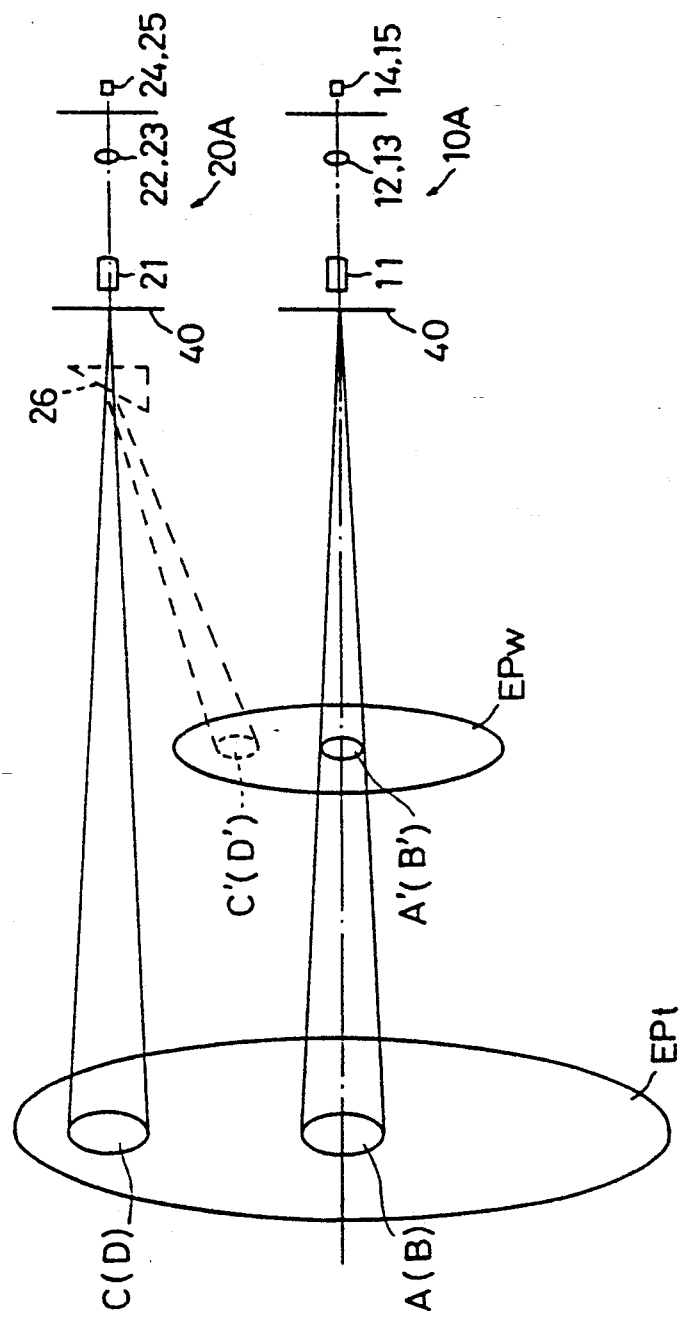
FIG. 2 is a conceptual view of the focus detecting apparatus shown in FIG. 1.

FIGS. 1 and 2 show an optical system of a first embodiment of the present invention, in which there are three pairs of focus detecting optical systems 10, 20, and 30 which are aligned in the radial direction of a taking lens to gather bundles of rays transmitted through an exit pupil EP of the taking lens to thereby detect the focus state of the taking lens.

The first focus detecting optical system 10, located on an optical axis Ax of the taking lens, includes a condenser lens 11 which gathers bundles of rays transmitted through different portions A and B of the exit pupil EP, a pair of separator lenses 12 and 13 which converge the bundles of rays to re-image separate images of an object image, and a pair of line sensors 14 and 15 which receive the separate images formed by the separator lenses.

Similarly, the second and third off-axis focus detecting optical systems 20 and 30 deviated from the optical axis Ax of the taking lens include condenser lenses 21 and 31, pairs of separator lenses 22, 23 and 32, 33, pairs of line sensors 24, 25 and 34, 35, and prisms 26 and 36 to detect the focus state of an off-axis focus detecting zone deviated from the optical axis Ax, respectively. Each of the prisms 26 and 36 has a power distribution which varies in the radial direction of the taking lens. The line sensors 24, 25 and 34, 35 receive the bundles of rays (i.e., object images) transmitted through different portions of the exit pupil EP of the taking lens, similar to the line sensors 14 and 15. The images formed by the line sensors 14, 15, 24, 25, and 34, 35 lie in a common plane, hereinafter referred to as a re-image surface.

The line sensors 14, 15, 24, 25, and 34, 35 of the respective focus detecting optical systems 10, 20, and 30 are located on the re-image surface along a line parallel to a radius of the taking lens and are symmetrical about a meridional plane. The meridional plane is defined by chief rays of conical bundles of rays from off-axis points on an object together with the optical axis. The chief rays are directed towards the centers of the respective line sensors. Accordingly, the line sensors are symmetric about a common meridional plane. Furthermore, each of the line sensors are positioned in a manner such that the lengthwise direction thereof is coincident with a corresponding sagittal plane (not shown). The sagittal planes are perpendicular to the meridional plane and contain the chief rays of the respective conical bundle of rays (i.e., the bundle of rays corresponding to a particular line sensor).

Each pair of line sensors 14, 15, 24, 25, and 34, 35 issues output signals corresponding to the separate images, so that an arithmetic operation circuit calculates a positional relationship of the separate images to enable the respective focus detecting optical systems 10, 20, and 30 to detect the focus state of the taking lens with respect to the object image observed through the exit pupil.

Namely, the outputs of the line sensors 14, 15, 24, 25 and 34, 35 are inputted to a signal processing circuit 100 and then a calculation controlling circuit 101 which calculates the positional relationship of the separate images to thereby detect the amount of defocus of the object detected by focus detecting device 10, 20, or 30, based on the outputs of the line sensors 14 and 15, 24 and 25, or 34 and 35. The outputted signals of the focus detecting optical systems 10, 20, and 30 which are to be used are selected by a photographer in accordance with a predetermined focus algorithm. The calculation controlling circuit 101 drives a control motor 102 provided in a camera body B, based on the calculation results, and actuates a focus adjusting mechanism 104 of the taking lens L, through a drive coupling 103, to thereby move a focus adjusting lens 105 of the taking lens in the optical axis direction.

The prisms 26 and 36, provided in the second and third focus detecting optical systems 20 and 30 having off-axis focus detecting zones, are selectively inserted in or retracted from the optical path when a displacement of the exit pupil EP occurs, so that the direction of the bundles of rays to be received by the condenser lenses 21 and 31 can be varied. The displacement of the exit pupil EP occurs when the taking lens is changed or when the zooming operation is effected.

As can be seen in FIG. 2, the exit pupil EPt of the taking lens at a telephoto extremity is farther from an equivalent focal plane 40 than the exit pupil EPw at a wide angle extremity. The size of the exit pupil varies depending on the F-number of the taking lens.

To compensate for this, for example, in the first focus detecting optical system 20 of the first embodiment illustrated in FIGS. 1 and 2, the prism 26 is retracted from the optical path of the focus detecting optical system, where it would gather the bundle of rays transmitted through the exit pupil EPt of the taking lens at the telephoto extremity and inserted into the optical path to gather the bundle of rays transmitted through the exit pupil EPw at the wide angle extremity. Consequently, the bundle of rays can be received by the focus detecting optical system even if the position and size of the exit pupil varies. Note that the bundles of rays transmitted through different portions C and D of the exit pupil EPt (or portions C' and D' of the exit pupil EPw), different from the portions A and B, are made incident on the respective line sensors 24 and 25 of the focus detecting optical system 20, but the two bundles of rays are overlapped for clarification of illustration proposes only.

Since a change in the angle at which the bundle of rays can be received by the prism, with respect to the displacement of the exit pupil, becomes large as the deviation of the bundle of rays from the optical axis of the taking lens increases, the apex angle of the outer prism 36 of the focus detecting optical system 30, which is located farther from the optical axis than the prism 26, is larger than the apex angle of the inner prism 26 of the focus detecting optical system 20.

Figure 3:
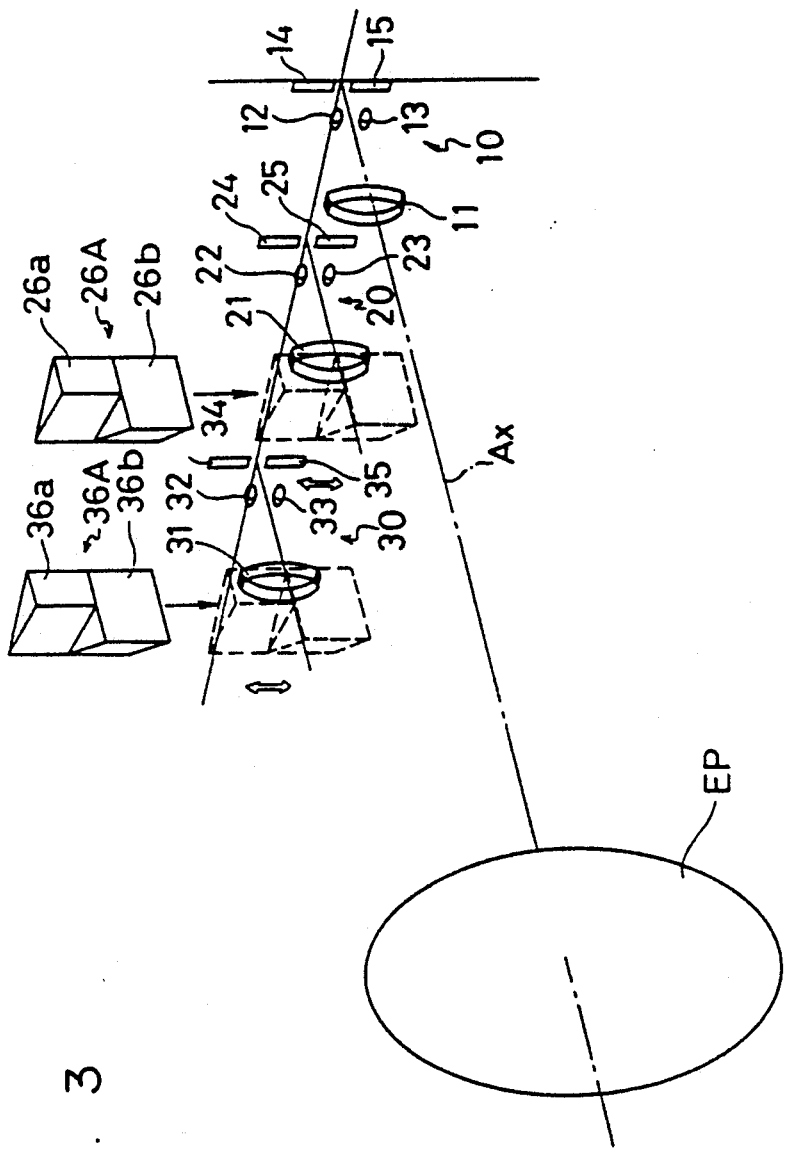
FIG. 3 is a schematic perspective view of a focus detecting apparatus according to a second embodiment of the present invention.
Figure 4:
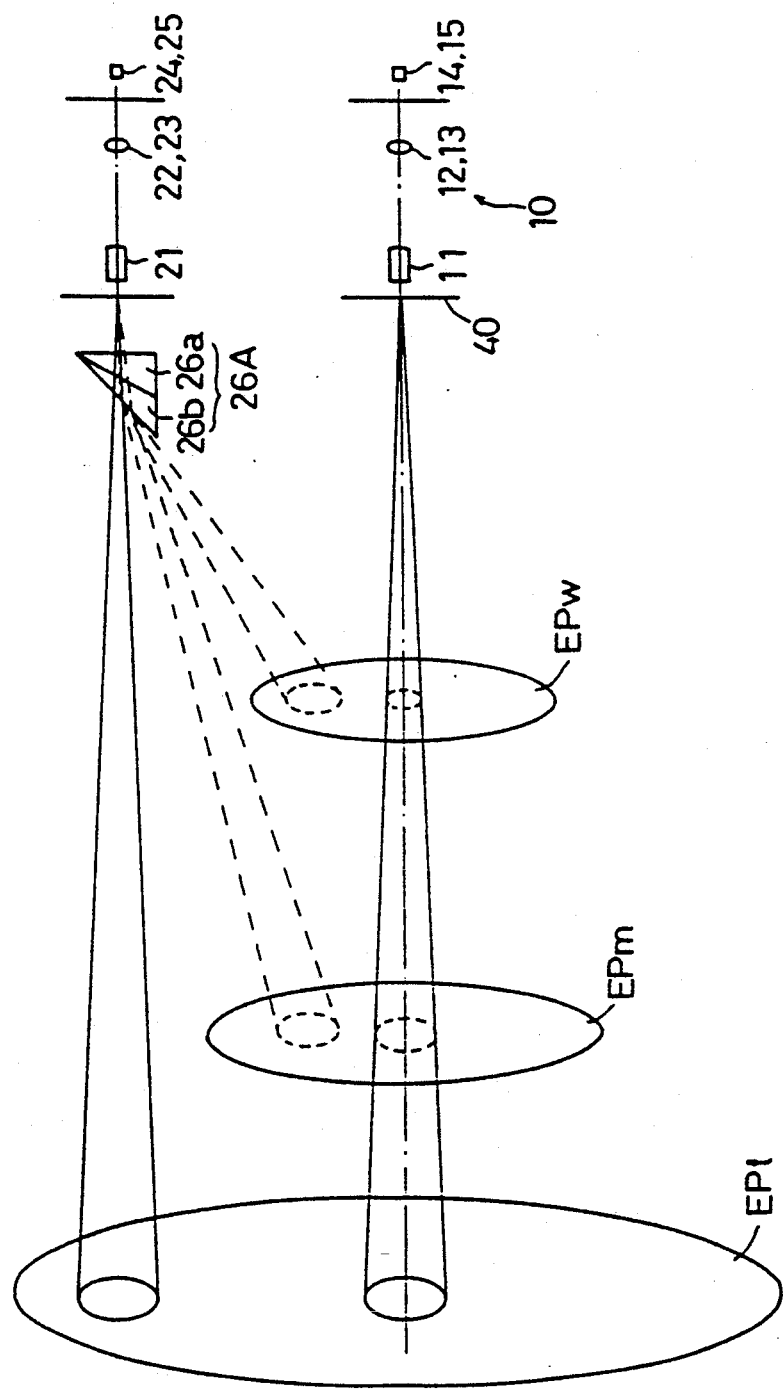
FIG. 4 is a conceptual view of the focus detecting apparatus shown in FIG. 3.

FIGS. 3 and 4 show a second embodiment of the present invention.

Unlike the first embodiment shown in FIGS. 1 and 2, in which there are two different angles of the bundle of rays with respect to the condenser lenses 21 and 31 when the prisms 26 and 36 are inserted in and retracted from the optical axis, a bundle of rays having a third angle with respect to the condenser lenses 21 and 31 can be set by moving the prisms up or down (see FIG. 3) while in the inserted position thereby realizing a total of three different angles of the bundle of rays.

Namely, the focus detecting optical systems 20A and 30A which detect the focus state of the focus detecting zones deviated from the optical axis Ax of the taking lens are provided with the movable prisms 26A and 36A which are comprised of prism elements 26a and 36a having a small apex angle and prism elements 26b and 36b having a large apex angle, respectively.

As can be seen in FIG. 4, for example, in the focus detecting optical system 20A, the prism 26A is retracted from the optical path of the focus detecting optical system, where it would receive the bundle of rays transmitted through the exit pupil EPt of the taking lens at the telephoto extremity. To receive the bundle of rays transmitted through the exit pupil EPm at a middle focal length, the prism element 26a of small apex angle is inserted into the optical path of the focus detecting optical system. To receive the bundle of rays transmitted through the exit pupil EPw at the wide angle extremity, the prism element 26b of large apex angle is inserted into the optical path of the focus detecting optical system.

As can be understood from the foregoing, according to the second embodiment, the exit pupil change due to the change in the focal length of the taking lens can be more effectively compensated for. Consequently, the focus states of different taking lenses can be precisely detected.

Figure 5:
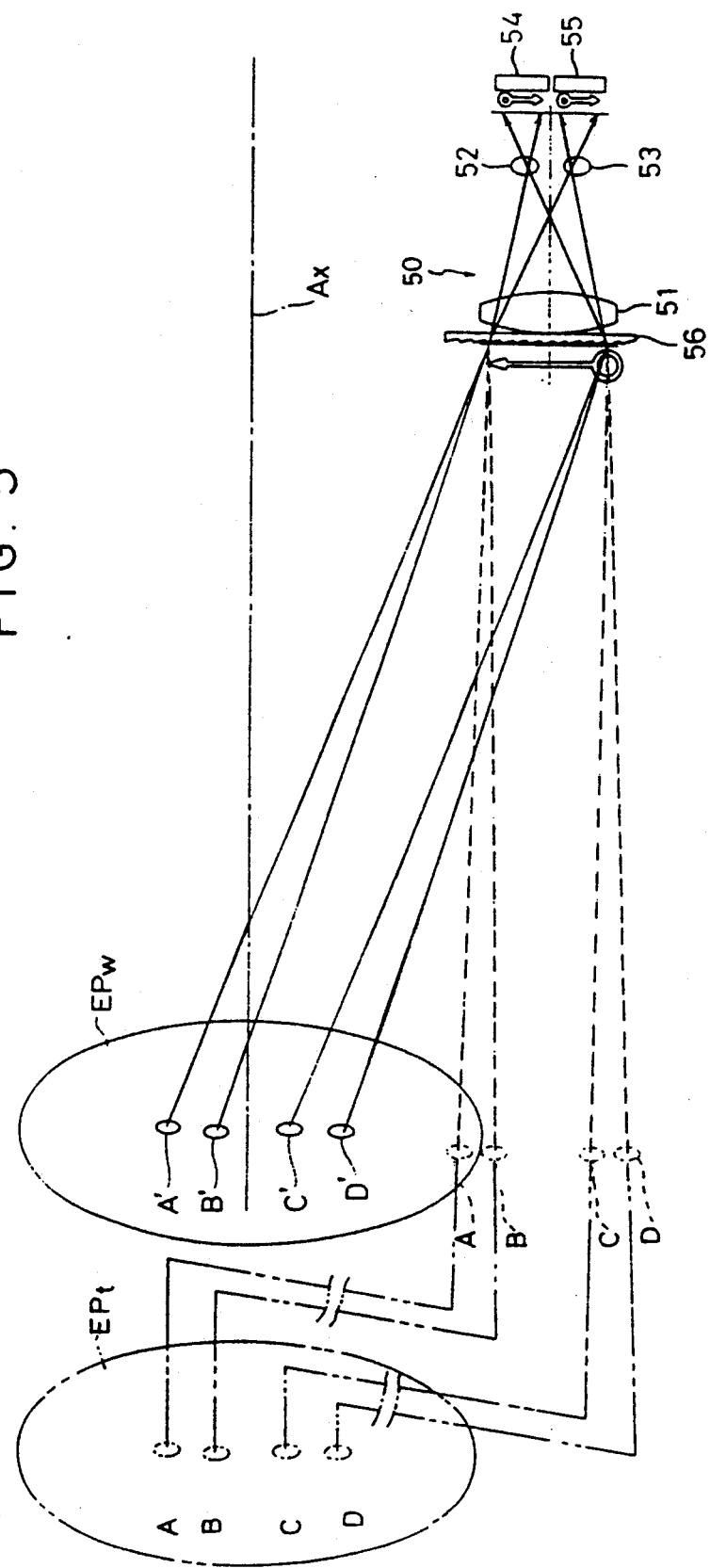
FIG. 5 is a schematic view of a focus detecting apparatus according to a third embodiment of the present invention.

FIGS. 5 through 7 show a third embodiment of the present invention. In the third embodiment, the focus detecting optical system 50 which is off-set from the optical axis Ax of the taking lens includes a condenser lens 51, a pair of separator lenses 52 and 53, a pair of line sensors 54 and 55, and a Fresnel prism 56 which is located in front of the condenser lens 51 on the side of the exit pupil. The line sensors 54 and 55 are aligned in the radial direction of the taking lens. The main difference between the third embodiment and the first and second embodiments is that, in the third embodiment the line sensors are positioned in a manner such that the lengthwise direction thereof is coincident with a corresponding meridional plane rather than a sagittal plane as in the first and second embodiments.

The Fresnel prism 56 has a power distribution which varies in the direction of alignment of the line sensors 54 and 55 in a manner such that the bundle of rays emitted from the exit pupil EP of the taking lens is made incident upon the condenser lens 51. If a Fresnel prism were not provided, only the bundle of rays transmitted through the portions A, B, C, and D outside the exit pupil EP could be received by the focus detecting optical system 50. Accordingly, an object image could not be reimaged on the line sensors. The Fresnel prism 56 makes it possible to re-image separate object images on the line sensors, by using the bundles of rays transmitted through the portions A', B', C', and D' of the exit pupil EP.

In comparison with an ordinary prism, the Fresnel prism 56 has the advantage that distortion caused by the change in optical path length due to the different positions of the bundle of rays transmitted through the prism does not occur.

In the illustrated third embodiment, the Fresnel prism 56 is immovably provided in front of the condenser lens 51 as mentioned above, but it is possible to use a movable Fresnel prism which can be selectively inserted in and retracted from the optical path of the condenser lens 51 In this alternative, the exit pupil of the taking lens is represented by the exit pupil EPw at the wide angle extremity and the exit pupil EPt at the telephoto extremity (shown at a phantom line in FIG. 5) when the movable Fresnel prism 56 is inserted into the optical path and when the movable Fresnel prism 56 is retracted from the optical path, respectively. In this regard, the focus detecting optical system 50 functions in the same way as that of the previous embodiments.

FIGS. 6A, 6B, and 6C and 7A, 7B, and 7C show modified arrangements of the Fresnel prism 56. The Fresnel surface of the Fresnel prism is located opposite the condenser lens 51 in FIGS. 6A through 6C and facing the condenser lens 51 in FIGS. 7A through 7C.

Figure 6A:
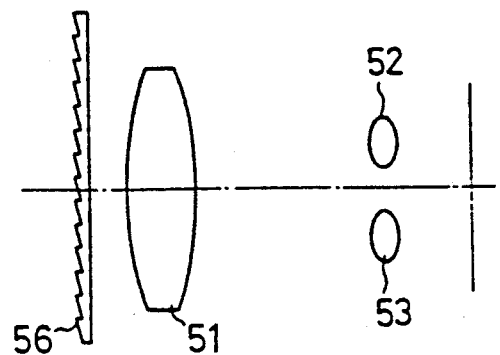
FIGS. 6A, 6B and 6C and FIGS. 7A, 7B and 7C are different arrangements of a Fresnel prism in the focus detecting apparatus shown in FIG. 5.
Figure 6B:
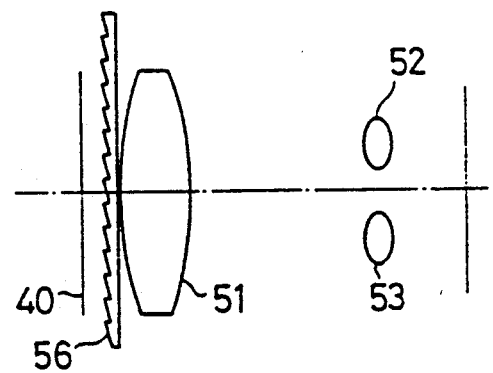
Figure 6C:
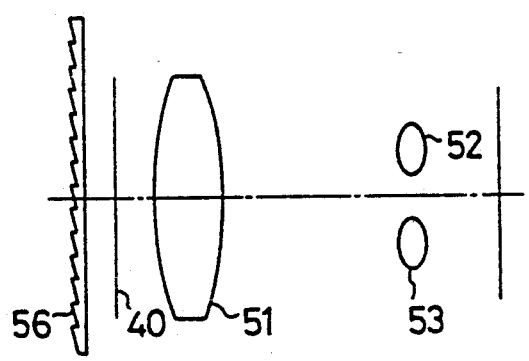
Figure 7A:
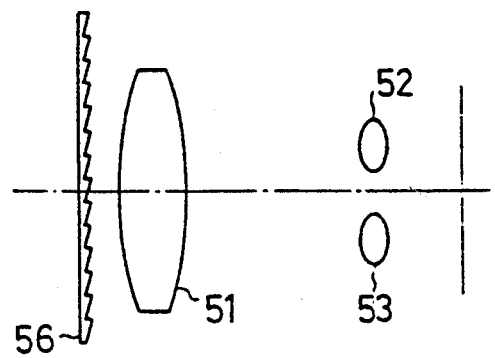
Figure 7B:
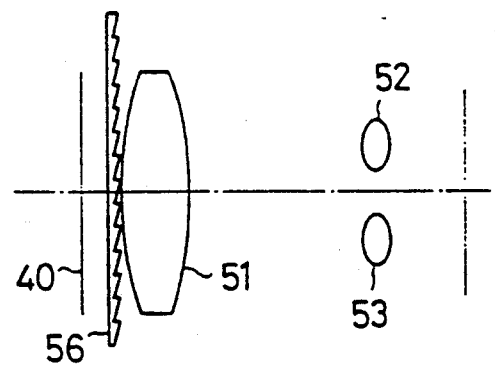
Figure 7C:
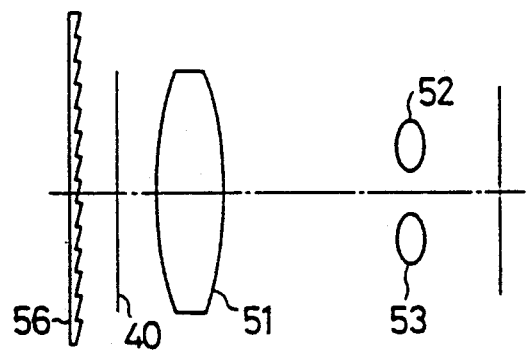

In FIGS. 6A and 7A, the Fresnel prism 56 is located substantially in an equivalent image forming plane 40 (i.e., a plane equivalent to the film plane). The Fresnel prism 56 is located o the side of the image forming plane 40 closer the condenser lens 51 in FIGS. 6B and 7B, and is located on the opposite side of the image forming plane 40 in FIGS. 6C and 7C. As can be seen from FIGS. 6A-6C and 7A-7C, the Fresnel prism 56 can be optionally located in, before or behind the equivalent image forming plane 40 in the vicinity thereof.

Figure 8:
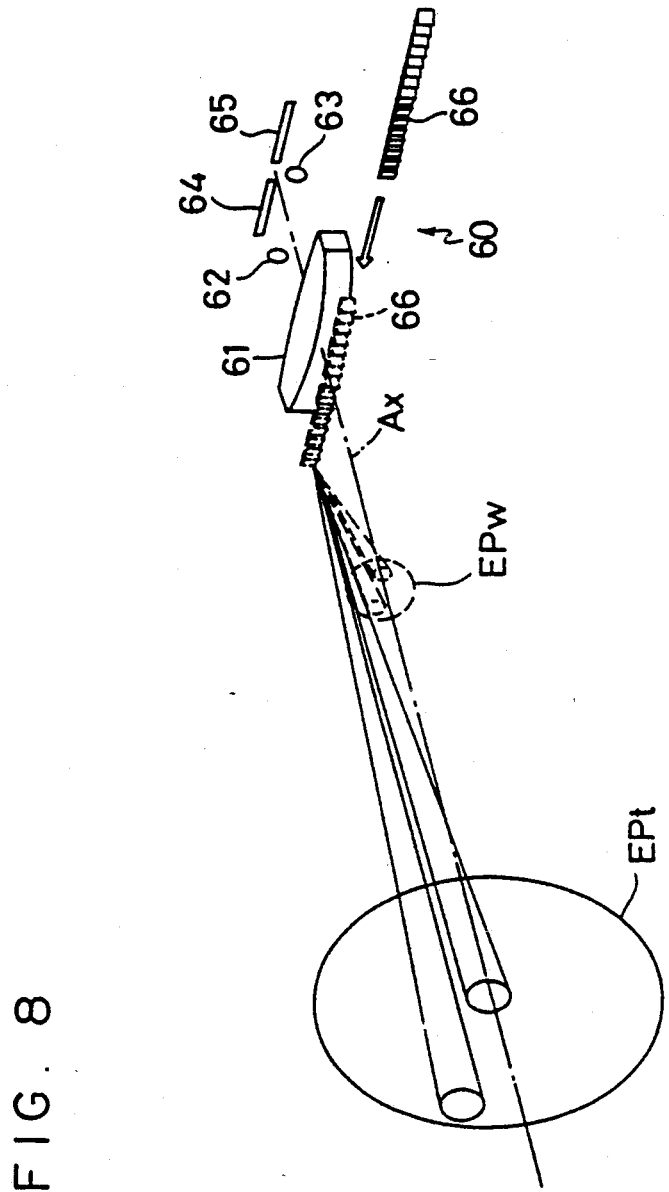
FIG. 8 is a schematic perspective view of a focus detecting apparatus according to a fourth embodiment of the present invention.
Figure 9:
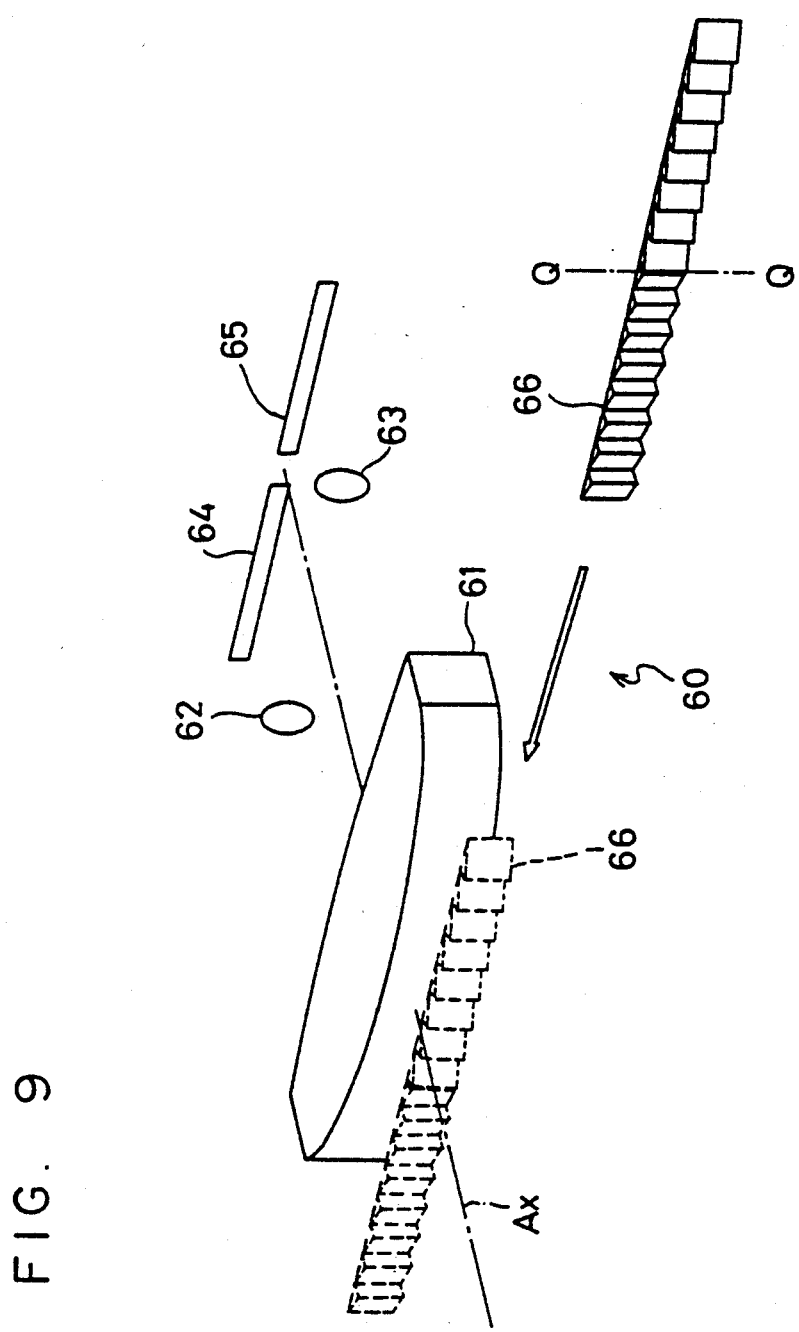
FIG. 9 is an enlarged view of a main part of the focus detecting apparatus shown in FIG. 8.

FIGS. 8 and 9 show a fourth embodiment of the present invention, in which the focus detecting optical system 60 has a focus detecting zone which is symmetrical about the optical axis Ax of the taking lens (i.e., the line sensors 64 and 65 are symmetrical about the optical axis of the taking lens) and lies in the meridional plane. The focus detecting optical system 60 is comprised of a condenser lens 61, a pair of separator lenses 62 and 63, a pair of line sensors 64 and 65, and a symmetrical Fresnel prism 66, which is provided in front of the condenser lens 61 to be selectively inserted in and retracted from the optical axis of the condenser lens 61.

The symmetrical Fresnel prism 66 has a symmetrical power distribution about a center line Q—Q which varies in the lengthwise direction of the prism. Namely, the Fresnel prism 66 is made of two parts which are split by the optical axis Ax and which have a symmetrical power distribution to deflect the off-axis bundles of rays toward the optical axis of the taking lens in the meridional plane, parallel to the direction of alignment of the line sensors 64 and 65, when the Fresnel prism 66 is correctly inserted in the optical path of the condenser lens 61.

The symmetrical arrangement of the line sensors 64 and 65, with respect to the optical axis Ax, eliminates an adverse influence caused by a change in the size and position of the exit pupil of a taking lens, as long as the area to be detected is small However, if the width of the area to be detected is large, the bundle Of rays transmitted through the exit pupil EPt at the telephoto extremity and the bundle of rays transmitted through the exit pupil EPw at the wide angle extremity in an upper portion of an object image will not overlap. Consequently, the bundle of rays which forms an upper portion of the object image cannot be received by the line sensors at the wide angle extremity.

To solve this problem, in the fourth embodiment, the symmetrical Fresnel prism 66 is retracted from the optical path of the focus detecting optical system, where it would gather the bundle of rays transmitted through the exit pupil EPt at the telephoto extremity of the taking lens, and is inserted into the optical path to gather the bundle of rays transmitted through the exit pupil EPw at the wide angle extremity. As a result, the bundle of rays which forms the upper portion of the object image on the line sensors is bent toward the optical axis to be made incident on the condenser lens 61. Thus, the object image can be reformed on the line sensors, regardless of the position of the exit pupil.

Figure 10:
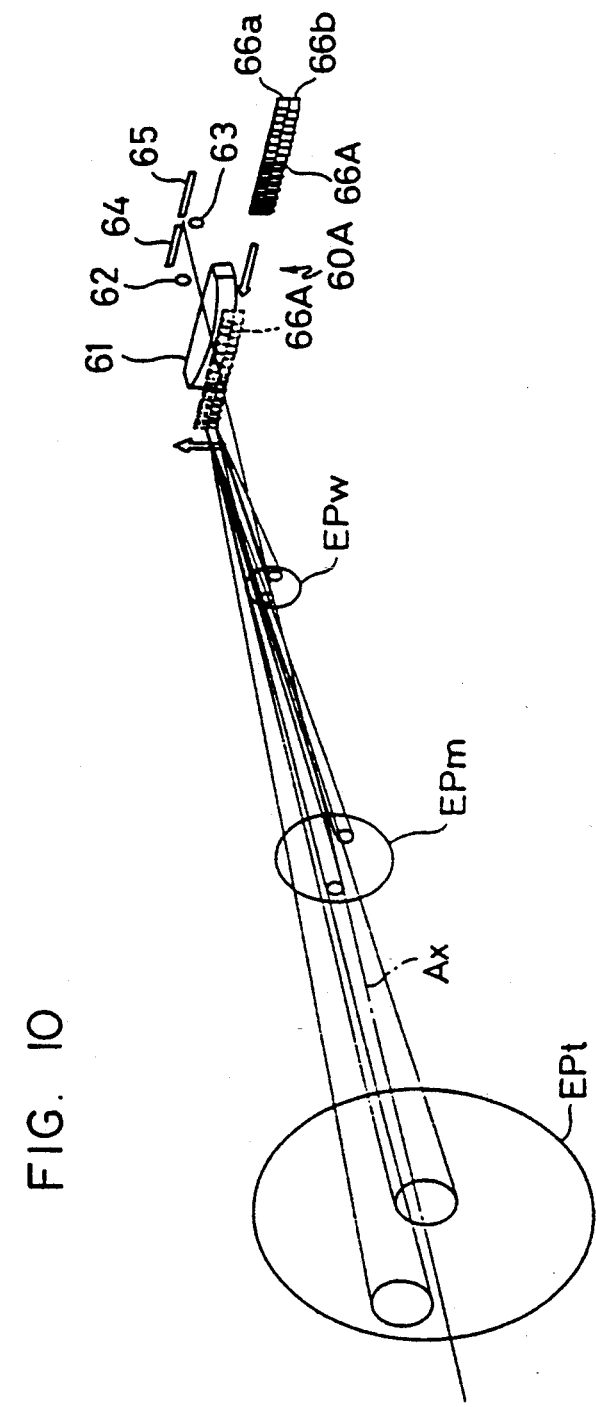
FIG. 10 is a schematic perspective view of a focus detecting apparatus according to a fifth embodiment of the present invention; and, FIG. 11 is an enlarged view of a main part of the focus detecting apparatus shown in FIG. 10.
Figure 11:
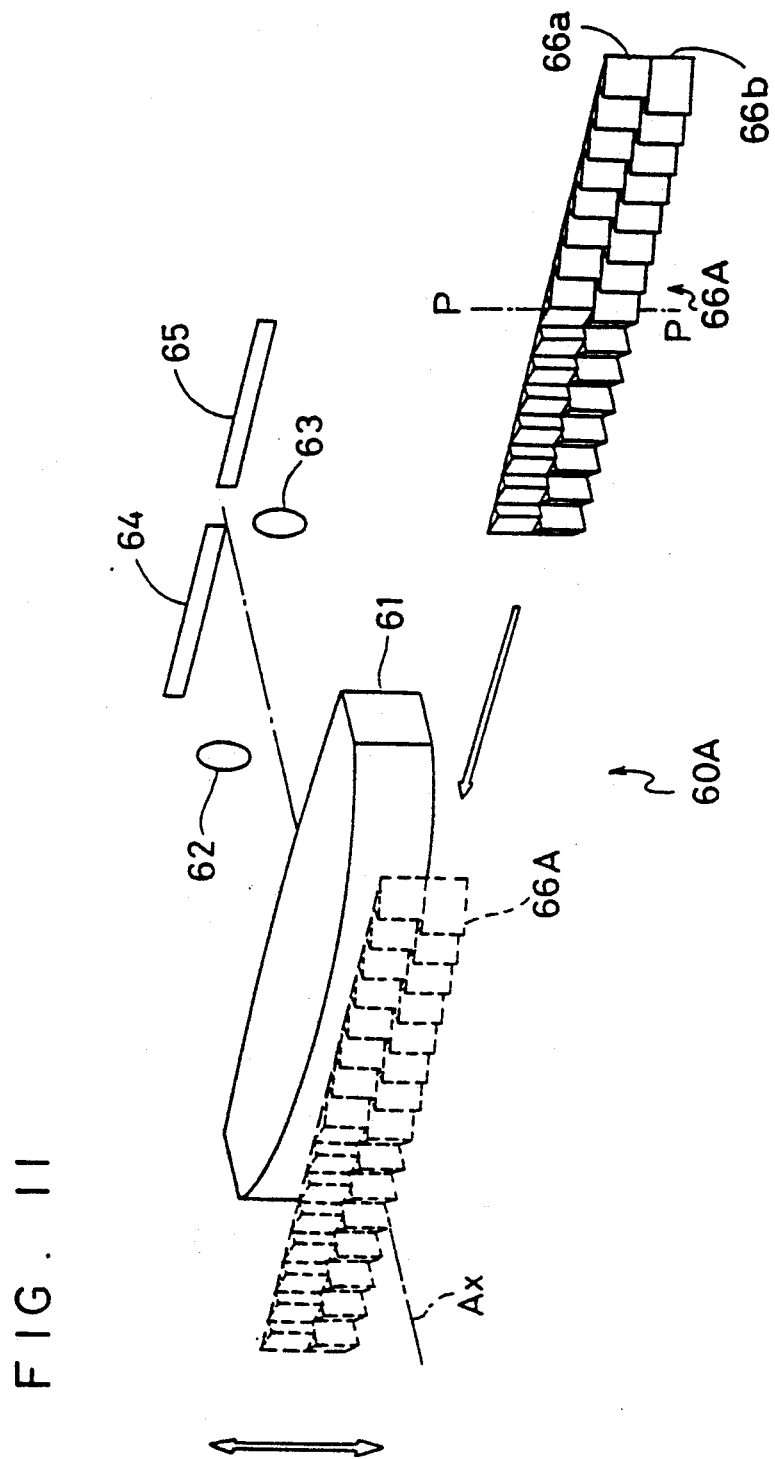

FIGS. 10 and 11 show a fifth embodiment of the present invention.

In this embodiment, contrary to the fourth embodiment in which the symmetrical Fresnel prism 66 is inserted in and retracted from the optical path to provide two different light receiving or gathering angles, as mentioned above, the Fresnel prism 66A is movable (slidable) up and down in FIGS. 10 and 11 to realize three different light receiving or gathering angles.

In the fifth embodiment, the symmetrical Fresnel prism 66A is made by adhering a prism element 66a of small apex angle to a prism element 66b of large apex angle.

As can be seen in FIG. 10, in the focus detecting optical system 60A, the symmetrical Fresnel prism 66A is retracted from the optical path of the focus detecting optical system, where it would receive the bundle of rays transmitted through the exit pupil EPt at the telephoto extremity of the taking lens. The symmetrical Fresnel prism 66A is driven in a manner such that the prism element 66a of small apex angle and the prism element 66b of large apex angle are selectively inserted into the optical path to receive the bundle of rays transmitted through the exit pupil EPm at a middle focal length and the bundle of rays transmitted through the exit pupil EPw at the wide angle extremity, respectively.

As can be understood from the foregoing, in the focus detecting apparatus according to the fifth embodiment of the present invention, the exit pupil change can be effectively compensated for, and accordingly, focus states of the on-axis focus detecting zones of various taking lenses can be accurately detected.

As can be seen from the above discussion, according to the present invention, even if a change in the position and size of an exit pupil of a taking lens occurs when, for example, the taking lens is changed or the zooming operation is effected, a bundle of rays can be received by the line sensors, so that the focus state of the taking lens can be precisely detected.

I claim:

1. A focus detecting apparatus in which bundles of rays, transmitted through different portions of an exit pupil of a taking lens, are transmitted through a common focus detecting zone on a predetermined focal plane of the taking lens and converged onto corresponding line sensors, said apparatus comprising:
   separator lenses which re-image an image formed on the predetermined focal plane of the taking lens into at least two separate images on said line sensors; and
   deflecting means positioned between the taking lens and said separator lenses for deflecting an optical path of the bundles of rays in a manner that makes the bundles of rays incident upon said separator lenses and said line sensors, said deflecting means being selectively inserted in an optical path between the taking lens and said separator lenses in accordance with the focal length of the taking lens.

2. A focus detecting apparatus according to claim 1, wherein said deflecting means is inserted in and retracted from the optical path between the taking lens and said separator lenses at a short focal length and a long focal length of the taking lens, respectively.

3. A focus detecting apparatus according to claim 2, wherein the common focus detecting zone includes the optical axis of the taking lens.

4. A focus detecting apparatus according to claim 2, wherein the common focus detecting zone is offset from the optical axis of the taking lens.

5. A focus detecting apparatus according to claim 2, wherein said deflecting means comprises a plurality of optical elements having different light deflecting powers, at least one of said elements being selectively inserted into the optical path between the taking lens and said separator lenses in accordance with the focal length of the taking lens.

6. A focus detecting apparatus according to claim 2, wherein said deflecting means comprises an optical element having a high light deflecting power which is inserted into the optical path at the short focal length of the taking lens and an optical element of having a low light deflecting power which is inserted into the optical path at the long focal length of the taking lens.

7. A focus detecting apparatus according to claim 2, wherein said deflecting means comprises a plurality of optical elements having different light deflecting powers that are selectively inserted in and retracted from the optical path between the taking lens and said separator lenses in accordance with the focal length of the taking lens.

8. A focus detecting apparatus according to claim 7, wherein said deflecting means is inserted into the optical path between the taking lens and said separator lenses when the taking lens has a short or medium focal length.

9. A focus detecting apparatus according to claim 8, wherein one of said optical elements of said deflecting means having a high light deflecting power is inserted into the optical path between the taking lens and said separator lenses when the taking lens has a short focal length.

10. A focus detecting apparatus according to claim 9, wherein one of said optical elements of said deflecting means having a low light deflecting power is inserted into the optical path between the taking lens and said separator lenses when the taking lens has a medium focal length.

11. A focus detecting apparatus according to claim 1, wherein said deflecting means comprises a prism.

12. A focus detecting apparatus according to claim 1, wherein said deflecting means comprises a Fresnel prism.

13. A focus detecting apparatus according to claim 1, wherein said deflecting means is located in a predetermined focal plane.

14. A focus detecting apparatus comprising:
   a pair or separator lenses which re-image an object image, formed by a taking lens on a predetermined focal plane, into at least two separate images;
   a plurality of sensors which receive the images formed by said separator lenses; and,
   deflecting means selectively inserted in and retracted from an optical path between the separator lenses and the taking lens, for deflecting the optical path in accordance with a change in an exit pupil of the taking lens.

15. A focus detecting apparatus according to claim 14, wherein said sensors comprises line sensors which are symmetrical about a meridional plane of the taking lens, each of said line sensors being positioned in a corresponding sagittal plane perpendicular to said meridional plane.

16. A focus detecting apparatus according to claim 14, wherein said sensors comprise line sensors which are perpendicular to and symmetrical about the optical axis of the taking lens and are positioned in a meridional plane.

17. A focus detecting apparatus according to claim 14, wherein said sensors comprise line sensors which are symmetrical about the optical axis of the taking lens and lie in a meridional plane.

18. A focus detecting apparatus according to claim 14, wherein said sensors comprise one or more pairs of line sensors.

* * * * *

UNITED STATES PATENT AND TRADEMARK OFFICE
CERTIFICATE OF CORRECTION

PATENT NO. : 5,241,168

DATED : August 31, 1993

INVENTOR(S) : T. SENSUI

It is certified that error appears in the above-indentified patent and that said Letters Patent is hereby corrected as shown below:

At column 7, line 51 (claim 6, line 5) of the printed patent, delete "of".

At column 8, line 41 (claim 15, line 2) of the printed patent, change "comprises" to ---comprise---.

Signed and Sealed this

Thirtieth Day of August, 1994

Attest:

BRUCE LEHMAN

Attesting Officer

Commissioner of Patents and Trademarks